July 22, 1952
J. H. RAMSEY
2,603,834
VULCANIZING APPARATUS
Filed Nov. 18, 1950
4 Sheets-Sheet 1
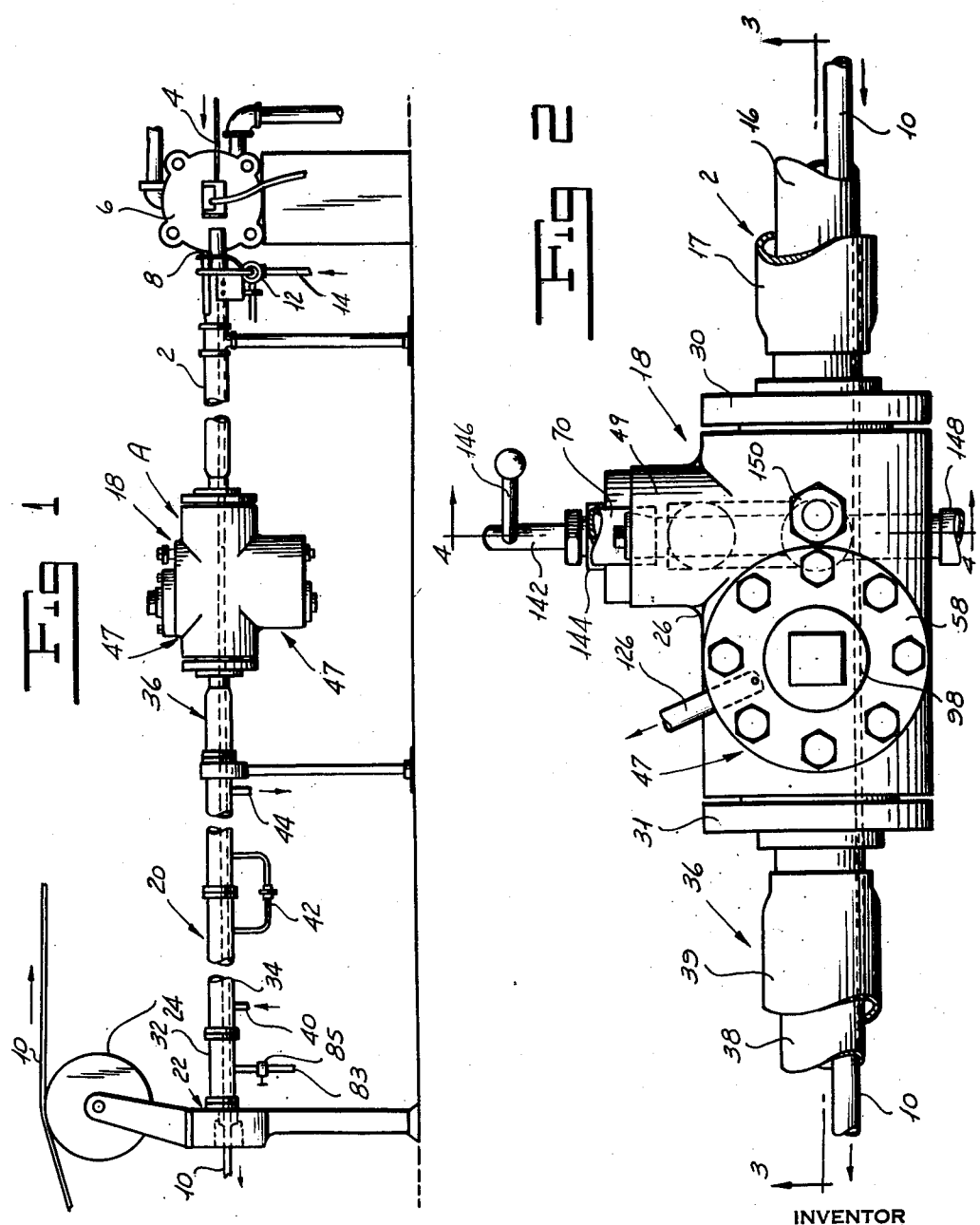
INVENTOR
JUSTIN H. RAMSEY
BY *Alfred W. Wilber*
ATTORNEY

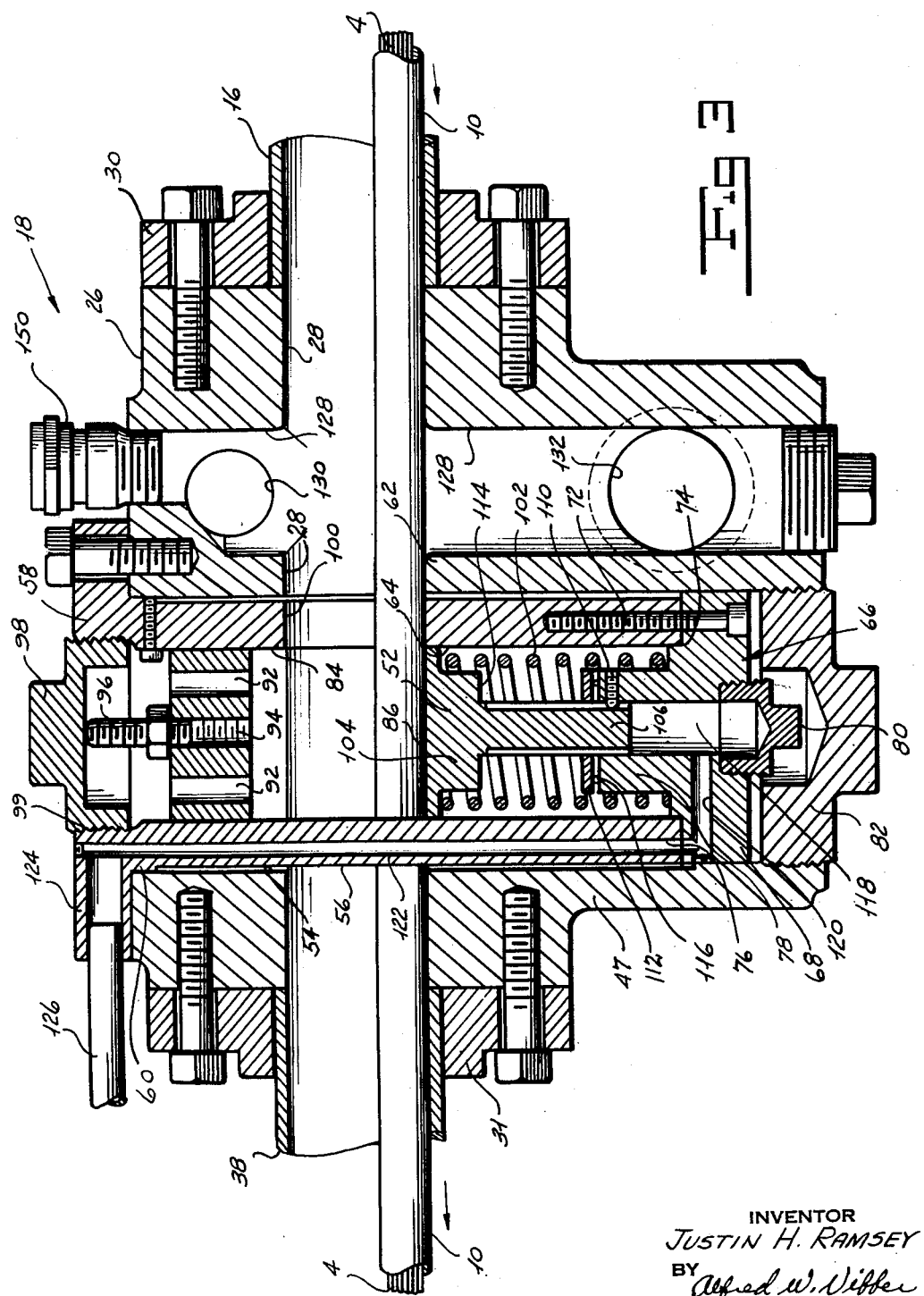

July 22, 1952          J. H. RAMSEY          2,603,834
VULCANIZING APPARATUS
Filed Nov. 18, 1950          4 Sheets-Sheet 3
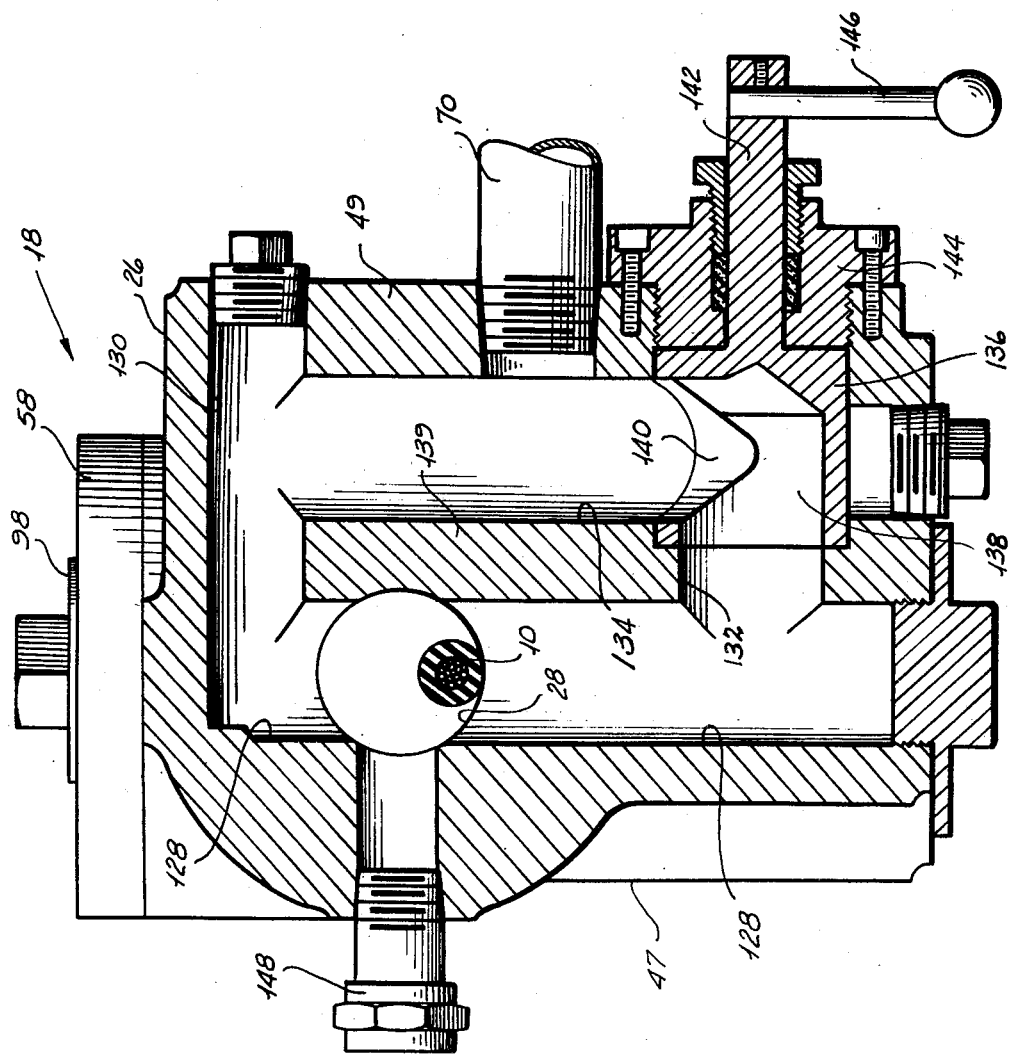
INVENTOR
JUSTIN H. RAMSEY
BY
Alfred W. Nibber
ATTORNEY

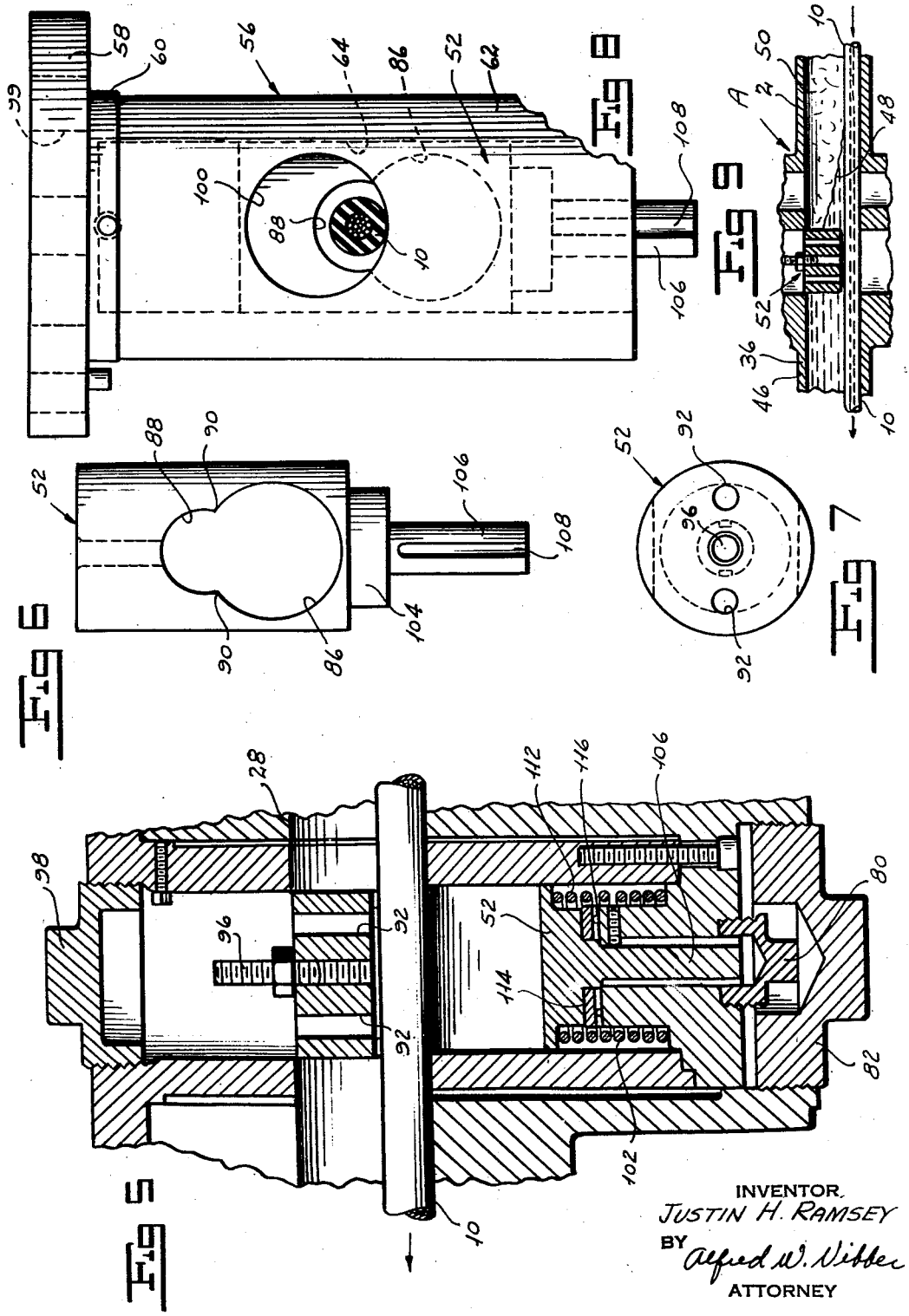

Patented July 22, 1952

2,603,834

UNITED STATES PATENT OFFICE 2,603,834

VULCANIZING APPARATUS

Justin H. Ramsey, Allendale, N. J.

Application November 18, 1950, Serial No. 196,451

11 Claims. (Cl. 18—6)

This invention relates to an apparatus for continuously vulcanizing elongated vulcanizable members such as the extruded sheaths on electrical conductors.

The apparatus shown and claimed in this application represents an improvement over that shown and described in Patent No. 2,561,820, July 24, 1951, of which the present inventor is one of the joint inventors.

The present invention has for an object thereof the provision of a mechanism which holds the gate or partial barrier between the condensate and the vulcanizing steam in the cooling and vulcanizing zones, respectively, of the chamber open when the apparatus is in inoperative condition and which automatically closes the gate or partial barrier upon initiation of the vulcanizing procedure. In the embodiment shown such gate operating mechanism is responsive to the steam pressure within the chamber. As a result, the present apparatus renders operation of the vulcanizing mechanism much easier in the loading operation and in the bringing of the apparatus to steady operating conditions.

Furthermore, in a preferred embodiment thereof, the apparatus of the invention provides in one unit the aforesaid gate or partial barrier and the condensate draining mechanism whereby the amount of condensate in the system and the location of the juncture between condensate and steam may be controlled. Such unit can be installed as a whole in existing continuous vulcanizing apparatus, and thus minimizes the possibility of faulty installation of apparatus in accordance with the invention of said application Serial No. 81,074 and of the present application. Consequently the installation of the present apparatus is much faster than is possible with that of the prior application, the vulcanizing apparatus as a whole requiring to be laid up, upon such change, for a relatively short time.

The above objects of the present invention and others will be more readily apparent upon consideration of the following description of a typical preferred embodiment of such apparatus.

In the drawings accompanying the specification and forming a part thereof:

Figure 1 is a view in side elevation of the complete continuous extruding, vulcanizing, and cooling apparatus of the invention, the apparatus being shortened in actual extent by omission of portions of the vulcanizing chamber and also of the cooling chamber;

Figure 2 is a view in plan of the unit designated 18 in the apparatus of Figure 1, such unit 18 embodying the automatically operated gate or partial barrier and the condensate drain mechanism whereby the amount of condensate in the system and the location of the juncture between the condensate and the steam may be suitably adjusted and controlled.

Figure 3 is a view in vertical longitudinal section through the said unit 18, the section being taken along the line 3—3 in Figure 2;

Figure 4 is a view in vertical transverse section through said unit 18, the section being taken along the line 4—4 in Figure 2, the partial barrier forming piston being shown in its raised, inoperative, position;

Figure 5 is a fragmentary view of the central, piston including, portion of the unit 18 in the position which the parts assume when the unit and the vulcanizing apparatus are in operative condition, with the piston in lowered position;

Figure 6 is a view in side elevation of said partial barrier providing piston;

Figure 7 is a view in plan of such piston;

Figure 8 is a view in side elevation of the piston containing cartridge in the unit 18, the piston being shown in the lowered position which it assumes when the vulcanizing apparatus is in operative position; and Figure 9 is a somewhat schematic view in longitudinal vertical axial section through the vulcanizing and cooling chamber at the location of the partial barrier member in unit 18.

As stated above, the unit 18 of the present invention, which embodies therein a partial barrier controlling mechanism and a condensate level controlling means in the form of a condensate drain mechanism, is designed to replace the apparatus for such purpose disclosed and claimed in application Serial No. 81,074. In Figure 1 of said prior application the mechanism for such purpose is designated generally by the reference character 18. The unit designated 18 in the present application is designed to replace the mechanism generally designated 18 in the prior application. The present unit 18 is thus shown in the view of the complete apparatus in Figure 1 of the drawings herein, wherein the same reference characters are employed to designate the same parts of the complete apparatus as are employed in said prior application Serial No. 81,074.

The vulcanizing chamber 2, as shown in Figure 1, includes a pipe disposed horizontally, such pipe providing therewithin a cavity through which the sheathed product travels. For the sake of simplicity the outer jacket member has been omitted from Figure 1. As more particularly shown in Figures 2 and 3, the vulcanizing chamber 2 is composed of the inner, sheathed conductor receiving, pipe 16, and the outer, steam jacket providing, pipe 17. Chamber 2, in a typical installation, will have a length on the order of 175 feet. To the forward end of the chamber 2 there is connected the extruding apparatus by means of which the conductor core is sheathed with a vulcanizable cover and is then fed into the vulcanizing chamber. As shown, the as yet unsheathed conductor core 4 is introduced, in a direction from right to left in Figure 1, through the die box of the extruding apparatus 6, from which it emerges as a sheathed conductor 10. The conductor 10 then travels through the connecting means 8 between the extruding head and vulcanizing chamber, such connecting means incorporating a valve means 12 through which, by means of inlet pipe 14, the vulcanizing steam is introduced into the vulcanizing chamber. In a typical installation such steam will be at a pressure of from 200-250 lbs. per sq. inch.

The sheathed conductor 10 travels through the chamber 2 and into the cooling chamber, formed as a prolongation of the vulcanizing chamber, the junction between the vulcanizing and cooling zones being located roughly in the zone designated A. In the apparatus of the invention no sealing means is employed between the exit end of the vulcanizing zone of the chamber and the inlet end of the cooling zone of the chamber, the two zones of the chamber being directly connected, as shown more clearly, in Figure 9. The sheathed conductor thus travels directly into and through the pipe 38 constituting the inner container of the cooling zone of the chamber in that portion adjacent unit 18, through the extension 32 of said pipe 38, and through the exit seal shown generally at 22 in Figure 1 at the left-hand end of the cooling zone of the chamber, from which the vulcanized cooled sheathed conductor emerges into the atmosphere. The conductor is then fed rearwardly to a conductor traversing and take-up means, not shown, over sheave 24.

The cooling zone of the chamber of the apparatus, that is, that portion of the chamber from zone A to the seal 22, will, in a typical installation, have a length on the order of 30 feet. The condensate, designated 46 in Figure 9, fills the left-hand end of the chamber by reason of the fact that the travel of the steam in the vulcanizing chamber is, as indicated, in a direction from right to left. Furthermore, the direction of travel of the sheathed conductor 10, which may travel at speeds up to 1000 feet per minute, is in the same direction. The conductor thus acts as a pump, constantly impelling condensate towards the exit end of the cooling zone of the chamber. These two factors, the direction of travel of the steam, and the direction of travel of the conductor, cause condensate from the steam to travel into the left-hand end of the chamber and to remain there. There is a fairly definite boundary between the condensate in the cooling zone of the chamber and the steam in the vulcanizing cavity 50 of the chamber 2. Normally some condensate will extend to the right of the gate forming piston 52, as shown at 48 in Figure 9, but such volume is small, due to the aforementioned forces acting upon the condensate which constantly urge it to the left.

As indicated in Figure 1, the cooling portion of the chamber is formed of a number of serially connected jacketed portions similar to that composing the inner, conductor receiving, tube 38 and the outer jacket tube 39 spaced therefrom, shown at the left in Figures 2 and 3. The jacket cavities in each of such cooling zone sections are serially connected by pipes of which one is shown at 42, so that cooling fluid may be introduced into such jackets through the pipe 40 at the left-hand end of the apparatus and exhausted therefrom through the pipe 44 at the right-hand end of the apparatus.

The apparatus may be provided at the left-hand end of the cooling zone with a further cooling liquid supply pipe 83 which connects directly to the inner, conductor receiving, pipe 32. By means of such pipe 83 and the shut-off 85 contained therein, the apparatus may be preliminarily primed with cooling fluid in the cooling chamber, as may sometimes be necessary in the starting up of operation of the apparatus.

As shown in Figures 2, 3, and 4, the unit 18 comprises a main body providing casting 26, through which extends a horizontal longitudinal passage 28 having the same diameter as the inner diameter of the pipes 16 and 38, and being so connected serially thereto as to allow the smooth uninterrupted passage of the conductor 10 through pipe 16, through the passage 28, and into pipe 38 of the cooling zone of the chamber. Connection between the left-hand end of pipe 16 and the casting 26 is afforded, as shown, by the flange type connector 30, whereas connection between the right-hand end of the pipe 38 and the casting 26 is effected by means of a similar flange connector 31.

The casting 26 generally consists of a first, vertical section 47, shown at the left in Figures 2 and 3, and a horizontal cylindrical portion 49, shown at the upper right in Figure 2 and at the right in Figure 3. Portion 47 of casting 26 is provided with a circular cylindrical bore 54 extending vertically therethrough, the cartridge 56 which contains the partial barrier providing piston 52, being received in bore 54. As shown, bore 54 is located centrally of the horizontal conductor receiving bore 28 through the casting, so that the axis of the piston 52 intersects the axis of the bore 28 normally thereto.

The cartridge 56 is provided at its top with a flange 58 which rests on top of the portion 47 of the casting 26, the flange being connected to the cartridge by studs, as shown. Beneath the flange 58 the cartridge is provided with a smooth cylindrical aligning portion 60 of relatively short vertical height, the lower surface of flange 58 being sealingly engaged with the upper surface of the casting part 47. Below annular surface 60 the cartridge 56 is reduced slightly in diameter as shown, such lower portion of the cartridge being designated 62.

The cartridge has extending axially therethrough the circular cylindrical bore 64 which slidably receives therein the aforesaid partial barrier providing piston 52. The piston has the diameter of main body portion 84 slightly less than the inner diameter of bore 64. The bottom end of the cartridge is closed by the member generally designated 66, member 66 being secured to the lower end of the cartridge by studs spaced angularly thereabout, of which one is shown at 72 in Figure 3. The upper surface of the main body portion 68 of the closure member 66 is provided with an annular seat 74 which snugly receives the bottom end of the cartridge, as shown in Figure 3. Member 68 is provided centrally thereof with the upstanding hollow boss 76, such boss having the circular cylindrical bore 78 therethrough. The central hole through member 68 in the cartridge closure member 66 is closed by the plug member 80, threadedly received therein, such plug member having a bore of substantial height in its upper end to receive the lower end of the bottom stem member 106 of the piston 52, more particularly to be described hereinafter.

The main body of the piston 52 is designated by the reference character 84. The structure of such piston will be more readily appreciated by a consideration of Figures 6 and 7, wherein body portion 84 of the piston is shown as being provided with a large bore 86 transverse to the axis thereof. The diameter of the bore 86 is the same as the inner diameter of the tubes 16 and 38 and of the passage 28 through the casting 26 forming unit 18. Communicating with the bore 86 and formed on an axis parallel with the axis of such larger bore is the partially cylindrical smaller bore 88. The lines of juncture between the partially cylindrical bores 86 and 88 are designated 90. The axes of both bores 86 and 88 intersect the axis of the piston 52 normal thereto.

The upper portion of the body 84 of the piston is provided, as shown in Figures 3 and 7, with two vertical bores 92 spaced from the axis of the piston and extending from the top of the piston into bore 88. The piston is further formed with a vertical axial bore 94, bore 94 threadedly receiving the upstanding stud member 96, shown in Figure 3, such stud member, as will be apparent hereafter, acting as a stop member limiting the extent of vertical travel of the piston.

The cartridge 56 is closed at its top by the plug 98 threadedly received in the central opening at top thereof, such plug being interiorly hollow for a material extent so as to receive therein the upper portion of the stud 96. The cartridge 56 is provided with openings 100 through the side walls of portion 62 thereof, openings 100 being of circular cylindrical shape and having their axes intersecting at right angles the axis of the cartridge 56 and of the piston 52. Openings 100 are of the same diameter as the larger bore 86 through the piston. It will be apparent that when the piston 52 is in its upper position, as shown in Figure 3, there exists an opening through the walls of the cartridge and through the piston of a circular cylindrical shape equal to the size of the longitudinal passage through the vulcanizing and cooling zones of the chamber.

The piston 52 is held in such raised, inoperative, position by means of the compression coil spring 102 which, as shown, has its lower end telescoped about the boss 76 on member 68 and its upper end telescoped about the stem member 104 on the piston. Within the spring and coaxially of the piston there depends the still further reduced stem portion 106 of the piston, such stem portion being snugly received within the bore 78 in the boss 76. The stem 106 is provided at diametrically opposed locations with flutes 108, there being keys cooperating therewith, such keys being drill rods 110 extending through the upper portion of the boss 76 and into the flutes, whereby the piston is allowed to reciprocate but is held from rotation within the bore in the cartridge. A sealing washer 112 made of at least slightly resilient heat resistant material is located, as shown in Figure 3, about the stem member 106 of the piston. Such member 112 rests upon the raised annular surface 116 on top of the boss 76, the sealing member effecting a seal between the top of boss 76 and the bottom surface 114 of part 104 of the piston when the piston is in the lowered, operative, position shown in Figure 5.

The space 118 within the bore 78 in the boss and the bottom end of the stem 106 of the piston communicates with an exhaust sump (not shown) by means of the radial passage 120 in portion 68 of the bottom cartridge closure, such radial passage in turn communicating with the vertical passage 122 along one side of the cartridge. The upper end of passage 122 leads to the radially directed exhaust passage 124, which threadly receives within it the tube 126 leading to the aforementioned sump.

The casting 26 is provided, at the right thereof as shown in Figures 2 and 3, with a vertical bore 128, the axis of such bore intersecting the axis of the bore 28. Within the casting 26, as more clearly shown in Figure 4, there are two horizontal passages connecting with said vertical passage 128, the top horizontal passage being designated 130 and the bottom horizontal passage, positioned substantially below the passage 28, being designated 132. Casting 26 is further provided, in that portion designated 49, with the vertical passage 134 which connects the right-hand ends of the passages 130 and 132 to each other, as shown in Figure 4, through the medium of the interposed condensate drain valve which is generally designated 136. The condensate discharge pipe 70 shown also in Figure 2 is connected to passage 134 at a location above valve 136 but below passage 28. The passage 28 constantly communicates with the exhaust pipe 70 by means of the upper horizontal passage 130 and the vertical passage 134. Condensate will thus flow from passage 28 to pipe 70, when valve 136 is closed, only when such condensate reaches a height above the top of the portion 139 of the casting positioned between passages 128 and 134. When, however, the valve 136 is open, the condensate flows from passage 28 down through the passage 128, laterally through the valve 136, and upwardly into the discharge pipe 70. Pipe 70 is located sufficiently below the passage 28 and other portions of the cooling chamber so that, if necessary, the entire body of condensate in the cooling chamber may be thus discharged by the opening of valve 136. It will be seen, therefore, that the valve 136 affords a ready means whereby the height of the condensate in the cooling zone may be adjusted and thus the location of the juncture between the steam in the vulcanizing zone of the chamber and the condensate in the cooling zone of the chamber may be readily controlled to lie at or adjacent the location of the partial barrier member providing piston 52.

As shown in Figure 4, the portion 49 of the casting unit 18 is provided with a horizontal bore receiving the larger, inner, portion of the valve 136 for rotation about its axis in such bore. Main body 136 of the valve is provided with axial bore 138 therein, such bore extending, as shown, to an axial depth sufficient to communicate with the vertical passage 134. Through one portion of the side wall of the valve member 136 there is an opening 140, such opening being a cylindrical bore transverse to the axis of the valve the opening 140 having a diameter equal to the diameter of passage 134. Valve 136 may be rotated so that it establishes complete and unimpeded communication between the passages 132 and 134, or may be turned so that it is entirely closed. By turning the valve somewhat from the full open position, it may act as a throttle valve impeding communication between passages 132 and 134. The valve 136 is provided with a stem 142 which is rotatably received within a packing gland which is bolted to the face of the casting, as shown. The valve is manually rotated by means of the radially extending handle member 146 attached to the valve stem.

Unit 18 is provided with two sight glasses which are trained on the interior of the passage 28 immediately in advance of the partial barrier providing piston 52. The first of such sight glasses, designated 148, is disposed horizontally, as shown in Figure 4. The second of such sight glasses, designated 150, is disposed vertically above the axis of passage 28 to the right of the piston, as shown in Figure 2. Such sight glasses enable the operator to determine at any time where the line of juncture between the condensate and the steam lies in the chamber. It has been found that, once such apparatus has reached steady operating conditions, valve 136 may be left in one position in which it constantly allows a small amount of condensate to flow continuously to the sump via pipe 70, so that the juncture between steam and condensate will remain substantially at one location longitudinally of the chamber.

In initially preparing the apparatus, the sheathed conductor is, of course, first threaded through the continuous vulcanizing zone of the chamber and through the cooling zone of the chamber formed as a prolongation of such vulcanizing zone the piston 52 being then in raised, inoperative, position so that such threading operation is facilitated. It has been found that the threading through the piston and the cooling chamber may conveniently be effected by providing an enlargement on the leading end of the unsheathed conductor core, such enlargement being formed, for example, by wadding up a mass of the wire 4 on such leading end. Thereupon the vulcanizing chamber is subjected momentarily to steam pressure so that the enlarged forward end of the conductor core will be shot forward to the left in Figures 1, 2, and 3, through the larger bore 86 in the raised piston 52 and out through the left-hand end of the cooling zone of the chamber, from which the exit seal 22 has been temporarily removed. The enlarged end of the conductor core is then removed, the core is threaded through seal 22, and the seal is then mounted on the end of the chamber.

After the initial threading of the conductor core through the vulcanizing and cooling zones of the chamber, and after the extruding device has sheathed a length of conductor exceeding the length of the chamber, so that the sheathed conductor extends through both the inlet and outlet seals of the chamber, steam is then continuously introduced into the chamber through pipe 11. The construction of unit 18 of the present invention is such that the piston 52 is thereupon automatically lowered so as to decrease the size of the conductor receiving opening through the unit 18 at the location of the piston, thereby providing an effective partial barrier to aid in the preserving the stable location of the juncture between the condensate of the cooling zone and the steam in the vulcanizing zone of the chamber. Such automatic lowering of the piston 52 is effected as follows:

As above indicated, body portion 84 of piston 52 is made of a diameter slightly less than the diameter of the bore 64 in the cartridge 56. As an example, the piston may have a diameter of 2.997 inches as compared to an inner diameter of 3.000 inches of the cartridge bore. Consequently, there is some room for leakage of stream between the piston and the bore of the cartridge. Upon the subjection of the bore 28 of unit 18 to the continuous pressure of the stream, upon initiation of the vulcanizing cycle, the piston 52 is forced downwardly because of the area of the upper surface of the piston exposed to such steam pressure is greater than the bottom surfaces of the piston thus exposed. Furthermore, although the bottom surfaces of the piston are exposed to such pressure by reason of the aforesaid leakage between piston and cartridge bore, the access of the steam under pressure to the bottom surfaces of the piston is limited because of the relatively small amount of such leakage, so that the downward force exerted upon the piston by the steam by far exceeds the upward force thereon. Piston 52 is thus forced downwardly in the bore in the cartridge against the action of the spring 102, such downward travel of the piston continuing until surface 114 thereon contacts the upper surface of the sealing washer 112, thereby effecting a seal between surface 114, the washer 112, and the raised annular ridge 116 on boss member 76. Such seal effectively isolates space 118 from the source of steam pressure and checks the discharge of condensate from unit 18 through pipe 126 under steady operating conditions. So long as the vulcanizing chamber is subjected to the vulcanizing steam pressure the piston 52 remains in the lowered position shown in Figure 5 and Figure 8, in which the partial barrier member is positioned across the chamber.

In such position, the lines of juncture 90 between the smaller bore or partial bore 88 and the larger bore 86 in the piston lie generally along the surface of the bores 100 in the walls of cartridge 56. A typical example of the relationship between the diameter of the smaller bore 88 and the diameter of the sheathed conductor 10 is indicated in Figure 8. Opening 88 is of sufficient size to allow free travel of the sheathed conductor therethrough, but is sufficiently smaller than the passage through the vulcanizing and cooling zones of the chamber as effectively to localize the line or zone of juncture between the condensate in the cooling zone and the steam at the rear end of the vulcanizing zone.

The piston 52 remains in the lowered, operative, position shown in Figures 5 and 8, so long as the chamber is subjected to vulcanizing steam pressure. When the pressure of the steam is shut off from the vulcanizing zone, the piston 52 will rise under the action of the spring 102, the bores 92 allowing the escape of steam from the upper portion of the cartridge downwardly therethrough to allow the buffer stud 96 on the piston to contact the inner end of the plug 98.

The release of steam past the piston and between it and the bore in the cartridge, when the piston is in lowered, operative, position, is not detrimental to the operation of the device since such steam merely condenses in the space beneath the body 84 of the piston and the bore in the cartridge, the condensate, after it has built up above the top of the bore 86 in the piston, merely being added to the condensate in the cooling zone and eventually being exhausted to the sump by means of pipe 70. After extended operation of the device, and after the steam pressure has been shut off from the vulcanizing zone and the piston 52 has risen, the condensate remaining in the space beneath the body 84 of the piston and the top of boss 76 will flow into space 118 in boss 76 by reason of the path through the flutes 108. Upon initiation of a subsequent vulcanizing cycle in the system, such water is exhausted to the sump, upon the thrusting downward of piston 52, by way of bores 120, 122, and pipe 70, the bottom surfaces of the piston acting as a pump, there being communication between the space beneath the piston and the sump until the surface 114 at the bottom of the piston contacts the sealing washer 112.

When the apparatus is first placed in operation after the cooling zone 20 of the chamber has been allowed to become empty of liquid, an appreciable quantity of tap water is introduced into the chamber from the pipe 83 through the shut-off valve 85. Such valve is then closed and is not used again during continuous operation of the apparatus, since more than sufficient cooling fluid is derived from the condensate of the steam in the vulcanizing chamber during continued operation of the device.

It will be apparent that the device of my invention is simple, rugged, positive and fool-proof in its manner of installation and operation. As previously indicated, the unit 18 incorporating the selectively operable partial barrier and the condensate drain mechanism, whereby the condensate level is controlled, may simply be inserted as a whole into the existing continuous vulcanizing apparatus by being substituted for a portion of the chamber thereof at a zone located appropriately relative to the ends thereof in accordance with the above disclosure. Such installation, plus the connection of pipes 126 and 70 to a suitable discharge sump, are all that is necessary to place the device in operation. Under ordinary operating conditions, condensate discharge valve 136 may, after initial adjustment, be left unchanged in position over long periods of time.

Whereas for purposes of illustration I have described and shown a preferred embodiment of the vulcanizing apparatus of the present invention, it will be understood that such embodiment is illustrative only, and that the invention is capable of numerous variations as to details. The invention is, therefore, to be defined by the scope of the claims appended hereto.

I claim as new the following:

1. Apparatus for the continuous vulcanization of elongated vulcanizable material, comprising an elongated substantially horizontal chamber, an entrance seal at the forward end of the chamber through which the elongated material enters the chamber, means for introducing into the portion at the forward end of the chamber and for maintaining therein steam under pressure to form in the forward end of the chamber a vulcanizing zone, the rear portion of the chamber into which the vulcanized elongated material travels directly from the vulcanizing zone, housing a cooling zone, an exit seal at the rear end of the chamber through which the cooled vulcanized elongated material emerges from the chamber, said chamber throughout its length providing an open passage for the travel of the material therethrough and for the direct communication of the fluids within the vulcanizing and cooling zones with each other, and means for maintaining the chamber at the cooling zone, during operation of the apparatus, substantially filled with the condensate derived from the steam in the vulcanizing zone, said last named means comprising a partial barrier, said partial barrier being reciprocable from an operative position transversely in the chamber at the juncture between the vulcanizing zone and the cooling zone to an inoperative position substantially removed from the interior of the chamber, the partial barrier having an opening transversely therethrough at the bottom thereof somewhat larger than the cross-section of the elongated vulcanizable material to accommodate passage of such material therethrough and to establish direct intercommunication of the fluids within the vulcanizing and cooling zones when such partial barrier is in operative position, said partial barrier being imperforate at the top thereof in a direction parallel to the opening therethrough, means to urge the partial barrier member into inoperative position, and means responsive to initiation of the vulcanizing cycle to automatically move the partial barrier member into operative position.

2. Apparatus for the continuous vulcanization of elongated vulcanizable material, comprising an elongated substantially horizontal chamber, an entrance seal at the forward end of the chamber through which the elongated material enters the chamber, means for introducing into the portion at the forward end of the chamber and for maintaining therein steam under pressure to form in the forward end of the chamber a vulcanizing zone, the rear portion of the chamber into which the vulcanized elongated material travels directly from the vulcanizing zone housing a cooling zone, an exit seal at the rear end of the chamber through which the cooled vulcanized elongated material emerges from the chamber, said chamber throughout its length providing an open passage for the travel of the material therethrough and for the direct communication of the fluids within the vulcanizing and cooling zones with each other, and means for maintaining the chamber at the cooling zone, during operation of the apparatus, substantially filled with the condensate derived from the steam in the vulcanizing zone, said last named means comprising a partial barrier, said partial barrier being reciprocable from an operative position transversely in the chamber at the juncture between the vulcanizing zone and the cooling zone to an inoperative position substantially removed from the interior of the chamber, the partial barrier having an opening transversely therethrough at the bottom thereof somewhat larger than the cross-section of the elongated vulcanizable material to accommodate passage of such material therethrough and to establish direct intercommunication of the fluids within the vulcanizing and cooling zones when such partial barrier is in operative position, said partial barrier being imperforate at the top thereof in a direction parallel to the opening therethrough, means to urge the partial barrier member into inoperative position, and means responsive to the introduction of steam under pressure within the vulcanizing zone to automatically move the partial barrier member into operative position.

3. Apparatus for the continuous vulcanization of elongated vulcanizable material, comprising an elongated substantially horizontal chamber, an entrance seal at the forward end of the chamber through which the elongated material enters the chamber, means for introducing into the portion at the forward end of the chamber and for maintaining therein steam under pressure to form in the forward end of the chamber a vulcanizing zone, the rear portion of the chamber into which the vulcanized elongated material travels directly from the vulcanizing zone housing a cooling zone, an exit seal at the rear end of the chamber through which the cooled vulcanized elongated material emerges from the chamber, said chamber throughout its length providing an open passage for the travel of the material therethrough and for the direct communication of the fluids within the vulcanizing and cooling zones with each other, and means for maintaining the chamber at the cooling zone, during operation of the apparatus, substantially filled with the condensate derived from the steam in the vulcanizing zone, said last named means comprising a partial barrier, said partial barrier being reciprocable from an operative position transversely in the chamber at the juncture between the vulcanizing zone and the cooling zone to an inoperative position substantially removed from the interior of the chamber, the partial barrier having an opening transversely therethrough at the bottom thereof somewhat larger than the cross-section of the elongated vulcanizable material to accommodate passage of such material therethrough and to establish direct intercommunication of the fluids within the vulcanizing and cooling zones when such partial barrier is in operative position, said partial barrier being imperforate at the top thereof in a direction parallel to the opening therethrough, means to urge the partial barrier member into inoperative position, and means responsive to steam pressure within the vulcanizing zone to move the partial barrier member into operative position, said last named means comprising a cylinder in the housing and a piston, the piston being connected to the partial barrier member, and means for connecting the cylinder to the space within the housing and the space within the vulcanizing zone whereby when steam under pressure is admitted to the vulcanizing zone the partial barrier member is automatically moved to operative position.

4. Apparatus for the continuous vulcanization of a vulcanizable elongated member, comprising in combination an elongated chamber, seals at the forward and rear ends of the chamber, the elongated member traveling through the chamber from the forward to the rear end thereof, means for feeding steam under high pressure into the chamber adjacent its forward end, the rear portion of the chamber in which the vulcanized elongated member travels directly from the vulcanizing zone housing a cooling zone, said chamber throughout its length providing an open passage for the travel of the elongated member therethrough and for the direct, pressure transmitting, communication of the fluids within the vulcanizing and cooling zones with each other, a partial barrier member located within the chamber substantially at the juncture between the vulcanizing and the cooling zones, said partial barrier member being selectively positionable between operative and inoperative positions, said partial barrier member in operative position being positioned across the elongated chamber, said partial barrier member having an elongated member receiving opening through that part which is within the chamber when the partial barrier member is in operative position, said opening being of a size much smaller than the cross-section of the chamber but somewhat exceeding the cross-section of the elongated member, the partial barrier member when in inoperative position being substantially fully withdrawn outside the projected inner surface of the chamber, means to urge the partial barrier member into inoperative position, and means automatically operable upon initiation of the vulcanizing cycle to move the partial barrier member into operative position.

5. Apparatus for the continuous vulcanization of a vulcanizable elongated member, comprising in combination an elongated chamber, seals at the forward and rear ends of the chamber, the elongated member traveling through the chamber from the forward to the rear end thereof, means for feeding steam under high pressure into the chamber adjacent its forward end, the rear portion of the chamber in which the vulcanized elongated member travels directly from the vulcanizing zone housing a cooling zone, said chamber throughout its length providing an open passage for the travel of the elongated member therethrough and for the direct, pressure transmitting, communication of the fluids within the vulcanizing and cooling zones with each other, a partial barrier member located within the chamber substantially at the juncture between the vulcanizing zone and the cooling zone, said partial barrier member being selectively positionable between operative and inoperative positions, said partial barrier member in operative position being positioned across the elongated chamber, said partial barrier member having an elongated member receiving opening through that part which is within the chamber when the partial barrier member is in operative position, said opening being of a size much smaller than the cross-section of the chamber but somewhat exceeding the cross-section of the elongated member, the partial barrier member when in inoperative position being sustantially fully withdrawn outside the projected inner surface of the chamber, means to urge the partial barrier member into inoperative position, and means responsive to the introduction of steam under pressure within the vulcanizing zone to move the partial barrier member into operative position.

6. Apparatus for the continuous vulcanization of a vulcanizable elongated member, comprising in combination an elongated chamber, seals at the forward and rear ends of the chamber, the elongated member traveling through the chamber from the forward to the rear end thereof, means for feeding steam under high pressure into the chamber adjacent its forward end, the rear portion of the chamber in which the vulcanized elongated member travels directly from the vulcanizing zone housing a cooling zone, said chamber throughout its length providing an open passage for the travel of the elongated member therethrough and for the direct, pressure transmitting, communication of the fluids within the vulcanizing and cooling zones with each other, a partial barrier member in the form of a crosshead located within the chamber substantially at the juncture between the vulcanizing zone and the cooling zone, said partial barrier member being selectively reciprocable between operative and inoperative positions, said partial barrier member in operative position being located across the elongated chamber, said partial barrier member having an elongated member receiving opening through that part thereof which is within the chamber when it is in operative position, said opening being of a size much smaller than the cross-section of the chamber but somewhat exceeding the cross-section of the elongated member, the partial barrier member when in inoperative position being substantially fully withdrawn outside the projected inner surface of the chamber, means to urge the partial barrier member into inoperative position, and means responsive to steam pressure within the vulcanizing zone to move the partial barrier member into operative position, said last named means comprising a cylinder and piston, the piston being connected to the partial barrier member, and means for connecting the cylinder to the space within the vulcanizing zone, whereby when steam under pressure is admitted to the vulcanizing zone the partial barrier member is moved to operative position.

7. Apparatus for the continuous vulcanization of a vulcanizable elongated member, comprising in combination an elongated chamber, seals at the forward and rear ends of the chamber, the elongated member traveling through the chamber from the forward to the rear end thereof, means for feeding steam under high pressure into the chamber adjacent its forward end, the rear portion of the chamber in which the vulcanized elongated member travels directly from the vulcanizing zone housing a cooling zone, said chamber throughout its length providing an open passage for the travel of the elongated member therethrough and for the direct, pressure transmitting, communication of the fluids within the vulcanizing and cooling zones with each other, a housing member connected to the chamber approximately at the juncture of the vulcanizing and cooling zones, a cross-head selectively reciprocable in the housing member transverse to the length of the chamber between operative and inoperative positions, said cross-head carrying a partial barrier member, said partial barrier member in operative position being located across the elongated chamber, said partial barrier member having an elongated member receiving opening to that part which is within the chamber when it is in operative position, said opening being of a size much smaller than the cross-section of the chamber but somewhat exceeding the cross-section of the elongated member, the partial barrier member when in inoperative position being substantially fully withdrawn outside the projected inner surface of the chamber, means constantly to urge the partial barrier member into inoperative position, and means responsive to steam pressure within the vulcanizing zone to move the partial barrier member into operative position, said last named means comprising a portion of the housing member acting as a cylinder and a portion of the cross-head acting as a piston, and means for connecting the cylinder to the space within the vulcanizing zone, whereby when steam under pressure is admitted to the vulcanizing zone the partial barrier member is moved to operative position.

8. In a continuous vulcanizing apparatus including an elongated chamber having a vulcanizing zone and a cooling zone therein in direct, pressure transmitting, communication with each other, the improved partial barrier providing means between the vulcanizing and cooling zones which comprises a housing member for connecting together parts of the chamber substantially at the juncture between the vulcanizing and cooling zones, said housing member having an opening therethrough for connecting the vulcanizing and cooling zones of the elongated chamber and a partial barrier member in said housing member selectively reciprocable therein between operative and inoperative positions, said partial barrier member in operative position being located in said housing member so as to lie across the opening therethrough, said partial barrier member having an elongated member receiving opening through that part which is within the housing member when the partial barrier member is in operative position, said opening being of a size much smaller than the cross-section of the opening through the housing member but somewhat exceeding the cross-section of the elongated member, means to urge the partial barrier member into inoperative position in which it lies substantially fully withdrawn from and outside of the projected inner surface of the opening through the housing, and means to automatically move the partial barrier member into operative position in the housing member upon subjection of the opening through the housing member to steam pressure.

9. In a continuous vulcanizing apparatus including an elongated chamber having a vulcanizing zone and a cooling zone therein in direct, pressure transmitting, communication with each other, the improved partial barrier providing means between the vulcanizing and cooling zones which comprises a housing member for connecting together parts of the chamber substantially at the juncture between the vulcanizing and cooling zones, said housing member having an opening therethrough for connecting the vulcanizing and cooling zones of the elongated chamber, a partial barrier member in the form of a cross-head selectively reciprocable in said housing between operative and inoperative positions, said partial barrier member in operative position being located in said housing member so as to lie across the opening therethrough, said partial barrier member having an elongated member receiving opening through that part which is within the housing member when the partial barrier member is in operative position, said opening being of a size much smaller than the cross-section of the opening through the housing member but somewhat exceeding the cross-section of the elongated member, means constantly to urge the partial barrier member into inoperative position in which it lies substantially fully withdrawn outside the projected inner surface of the opening through the housing, and means responsive to steam pressure to move the partial barrier member into operative position in the housing member, said last named means comprising a cylinder and a piston, the piston being connected to the partial barrier member, and means for connecting the cylinder to the space within the housing, whereby when steam under pressure is admitted to the housing the partial barrier member is moved to operative position.

10. In a continuous vulcanizing apparatus including an elongated chamber having a vulcanizing zone and a cooling zone therein in direct, pressure transmitting, communication with each other, the improved partial barrier providing means between the vulcanizing and cooling zones which comprises a housing member for connecting together parts of the chamber substantially at the juncture between the vulcanizing and cooling zones, said housing member having an opening therethrough for connecting the vulcanizing and cooling zones of the elongated chamber, a partial barrier member in said housing member selectively reciprocable therein between operative and inoperative positions, said partial barrier member being in the form of a crosshead, said partial barrier member in operative position being located in said housing member so as to lie across the opening therethrough, said partial barrier member having an elongated member receiving opening through that part which is within the housing member when the partial barrier member is in operative position, said opening being of a size much smaller than the cross-section of the opening through the housing member but somewhat exceeding the cross-section of the elongated member, means to urge the partial barrier member into inoperative position in which it lies substantially fully withdrawn outside the projected inner surface of the opening through the housing, and means to move the partial barrier member into operative position in the housing member upon initiation of the vulcanizing cycle within the system, said last named means comprising a cylinder in the housing and a piston, the piston being connected to the partial barrier member, and means for connecting the cylinder to the space within the housing and the vulcanizing zone, whereby when steam under pressure is admitted to the vulcanizing zone the partial barrier member is moved to operative position.

11. In a continuous vulcanizing apparatus including an elongated chamber having a vulcanizing zone and a cooling zone therein in direct, pressure transmitting, communication with each other, the improved partial barrier providing means between the vulcanizing and cooling zones which comprises a housing member for connecting together parts of the chamber substantially at the juncture between the vulcanizing and cooling zones, said housing member having an opening therethrough for connecting the vulcanizing and cooling zones of the elongated chamber, a partial barrier member in said housing member selectively reciprocable therein between operative and inoperative positions, said partial barrier member being in the form of a cross-head, said partial barrier member in operative position being located in said housing member so as to lie across the opening therethrough, said partial barrier member having an elongated member receiving opening through that part which is within the housing member when the partial barrier member is in operative position, said opening being of a size much smaller than the cross-section of the opening through the housing member but somewhat exceeding the cross-section of the vulcanized elongated member, means to urge the partial barrier member into inoperative position in which it lies substantially fully withdrawn outside the projected inner surface of the opening through the housing, and means responsive to steam pressure within the opening through the housing to move the partial barrier member into operative position, said last named means comprising a portion of the housing member acting as a cylinder and a portion of the cross-head acting as a piston, the piston being connected to the partial barrier member, means connecting the cylinder to the space within the opening through the housing member, and means for connecting the housing member to the chamber intermediate the length thereof.

JUSTIN H. RAMSEY.

REFERENCES CITED

The following references are of record in the file of this patent:

UNITED STATES PATENTS

| Number | Name | Date |
| --- | --- | --- |
| 2,291,344 | Powell | July 28, 1942 |
| 2,373,816 | DeRoche et al. | Apr. 17, 1945 |
| 2,426,341 | Canfield | Aug. 26, 1947 |
| 2,540,497 | Stiegler | Feb. 6, 1951 |
| 2,561,820 | Ramsey et al. | July 24, 1951 |